United States Patent [19]

Rabinowitz et al.

[11] 4,245,171
[45] Jan. 13, 1981

[54] DEVICE FOR PRODUCING HIGH-POWERED RADIATION EMPLOYING STIMULATED RAMAN SCATTERING IN AN OFF-AXIS PATH BETWEEN A PAIR OF SPHERICAL MIRRORS

[75] Inventors: Paul Rabinowitz, Old Beth Page, N.Y.; Alexander Stein, Springfield, N.J.

[73] Assignee: Exxon Research & Engineering Co., Florham Park, N.J.

[21] Appl. No.: 25,401

[22] Filed: Mar. 30, 1979

[51] Int. Cl.³ .............................................. H03F 7/00
[52] U.S. Cl. ...................................... 307/426; 307/425
[58] Field of Search ............................... 307/426, 425

[56] References Cited

U.S. PATENT DOCUMENTS

| 3,253,226 | 5/1966 | Herriott et al. ............ 331/94.5 C X |
| 4,095,121 | 6/1978 | Begley et al. ........................ 307/425 |

OTHER PUBLICATIONS

Krautsov et al., "Sov. J. Quantum Electronics", Dec. 1976, pp. 1438–1440.

*Primary Examiner*—Rudolph V. Rolinec
*Assistant Examiner*—Darwin R. Hostetter
*Attorney, Agent, or Firm*—R. I. Samuel; A. H. Krumholz

[57] ABSTRACT

A device is disclosed for producing intense 16 micron radiation in which stimulated rotational Raman scattering takes place in parahydrogen on an off-axis path between a pair of spherical mirrors.

4 Claims, 4 Drawing Figures

DEVICE FOR PRODUCING HIGH-POWERED RADIATION EMPLOYING STIMULATED RAMAN SCATTERING IN AN OFF-AXIS PATH BETWEEN A PAIR OF SPHERICAL MIRRORS

FIELD OF THE INVENTION

This invention relates to the generation of radiation by Raman scattering and particularly to the generation of high-powered radiation in which stimulated rotational Raman scattering takes place in parahydrogen on an off-axis path between a pair of spherical mirrors.

BACKGROUND OF THE INVENTION

Stimulated Raman scattering of $CO_2$ laser radiation in parahydrogen has been suggested by others as a means of generating efficient powerful radiation in the 16 micron region of the electromagnetic spectrum, a region of intense interest because of its powerful usefulness for uranium isotope separation employing $UF_6$.

While the generation of radiation by Raman scattering in many ways is similar to the generation and amplification of radiation by conventional laser techniques, the differences between the physics of laser amplification and stimulated Raman scattering present different problems which must be dealt with in different ways. Thus, in a laser device, the medium is pumped to a state in which amplification may occur for a period of time after such state is achieved. The energization of the medium is an independent process from the amplification by stimulated emission. In stimulated Raman scattering, on the other hand, the medium is energized by a beam of radiation only while that beam is present. Thus, in order to amplify by stimulated Raman scattering, it is necessary to have a pumping light beam follow the same path during the same time as the beam being amplified.

It is also known that the gain per unit length achievable by stimulated Raman scattering at a point is a function of the intensity of the pump radiation at that point. It is also known that even the most collimated of light beams spread by diffraction. Thus, since the gain per unit length achievable by stimulated Raman scattering is a function of intensity, the gain drops as the pump radiation beam spreads lowering the intensity at any point therein. Thus, in order to maximize gain achievable by stimulated Raman scattering along a predetermined path length, it is desirable to repeatedly refocus the beam to achieve the higher intensities resulting in the higher gains.

One possibility that we examined to maintain high intensity along a path was the use of an optical waveguide to confine a tightly focussed beam to effectively extend the focal zone through the length of the guide thereby completely eliminating the effect of diffraction. The problem with a waveguide scheme is that the material of the guide is in close proximity to the intense optical field and damages easily, promoting plasma breakdown at much lower intensities than in an unconfined medium. Work relating to this scheme was published more than a year ago (September 1976) in "Applied Optics", Vol. 15, No. 9, Page 2005, in an article entitled "Waveguide $H_2$ Raman Laser."

Another possibility that was considered for the purpose of reestablishing high intensities sequentially along a gain path was the use of a periodic sequence of lenses to sequentially refocus the pumping light beam, thereby building up gain between each pair of lenses. Several difficulties arise from such a scheme. The most important difficulty is that the dispersion in any material that would cause sequential focussing of the pump radiation would have a different effect upon the stimulated radiation thereby focussing the pump radiation and the stimulated radiation in different places along the path, thereby reducing the total gain because of the fact that the radiation to be amplified would not be focussed in the same place as the pumping radiation. Further, this mismatch of focussing would be cumulative.

Many devices can be conceived of which include resonant structures for 16 microns which would provide sufficiently intense 16 micron radiation by rotational Raman scattering in parahydrogen if the source of pumping radiation could produce pumping radiation of sufficient power for long periods of time. Unfortunately, however, under the present state of the art, a pulse of approximately 100 nano-seconds in length is the maximum that is available to provide the pumping radiation. Thus, someone trying to produce 16 micron radiation by stimulated rotational Raman scattering in parahydrogen has this limitation to face as well.

BRIEF DESCRIPTION OF THE INVENTION

In accordance with the teachings of this invention, an apparatus is provided for producing radiation by Raman scattering which includes first and second spherical mirrors, each having a concave reflecting surface which is a section of a sphere having first and second radii and first and second centers of curvature. The first and second spherical mirrors are mounted with the first and second concave reflecting surfaces facing each other, defining an optical axis including the first and second centers of curvature and intersecting the first and second concave reflecting surfaces. A Raman active medium is maintained between the first and second spherical mirrors. The Raman active medium responds to a first frequency of radiation to produce a second frequency of radiation by Raman scattering. A hole is provided in one of the spherical mirrors for introducing radiation of the first frequency between the first and second spherical mirrors along a path which intersects the first and second spherical mirrors, but is not parallel to the optical axis, producing radiation of the second frequency by stimulated Raman scattering.

In the preferred embodiment of this invention, the first and second radii are equal and the first center of curvature lies on the optical axis between the second center of curvature and the second concave reflecting surface.

DESCRIPTION OF THE DRAWINGS

For a more complete understanding of the invention reference should be made to the following detailed description and drawings in which.

DETAILED DESCRIPTION OF THE INVENTION

Figure 1:
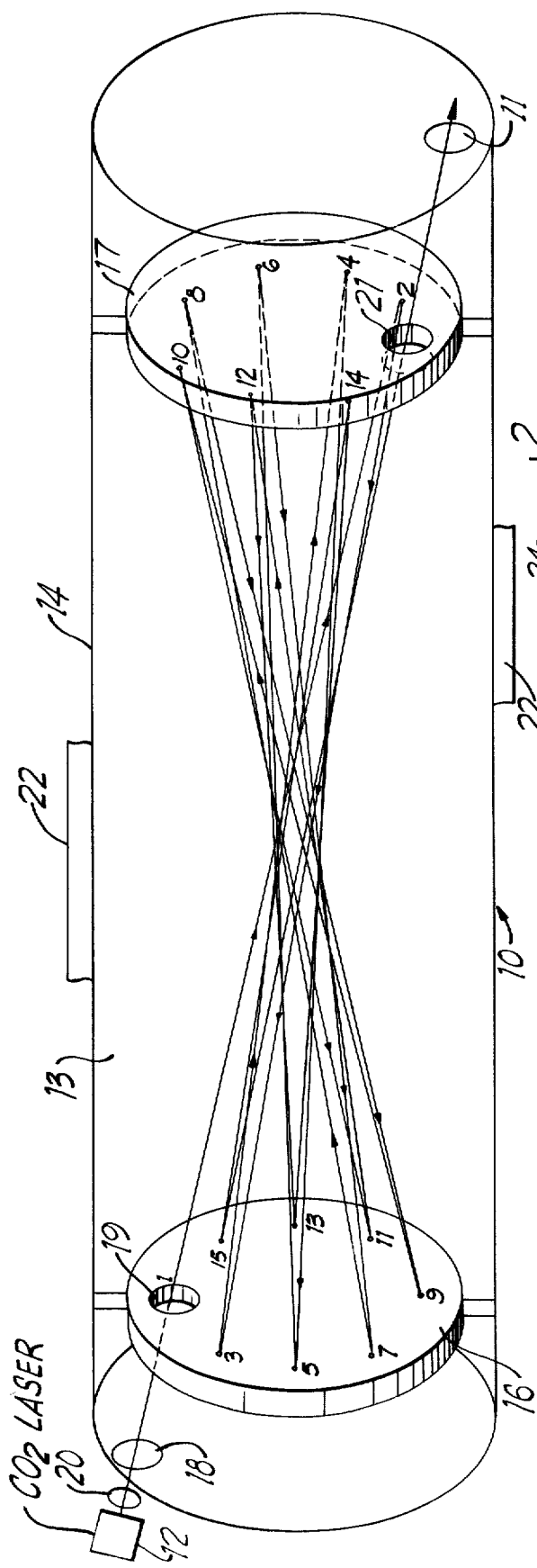
FIG. 1 is a view partially in cutaway isometric form, partially in schematic form showing a device for producing high-powered radiation employing stimulated Raman scattering in an off-axis path between a pair of spherical mirrors in accordance with the teachings of this invention.

Referring now to FIG. 1, we see a device 10 which provides high-powered 16 micron radiation through an exit port 11 by stimulated Raman scattering of $CO_2$ laser radiation (provided by a $CO_2$ laser 12) in parahydrogen 13 maintained in a chamber 14 between a pair of spherical mirrors 16 and 17. The $CO_2$ laser radiation passes through an entrance port 18, a hole 19 in the spherical mirror 16, reflects between the mirrors 16 and 17 as shown in FIG. 1, and passes out through a hole 21 in the spherical mirror 17 to the exit port 11. The spherical mirrors in the preferred embodiment of this invention have the same radius of curvature and are mounted with their concave reflecting surfaces facing each other, thereby defining an optical axis including their centers of curvature with the optical axis defined intersecting the concave reflecting surfaces of the spherical mirrors 16 and 17 preferably through the centers thereof. The center of curvature of the concave reflecting surface of the spherical mirror 16 is located between the concave reflecting surface of the spherical mirror 17 and its center of curvature. In a like fashion it is seen that the center of curvature of the concave reflecting surface of the spherical mirror 17 is located between the concave reflecting surface of the spherical mirror 16 and its center of curvature.

Figure 3:
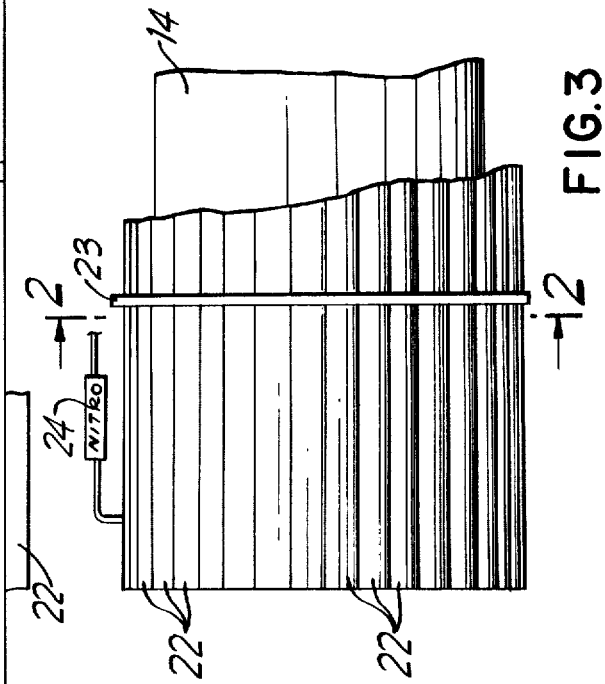
FIG. 3 is a side elevation view partially cut away showing the cooling system for the device of FIG. 1.
Figure 2:
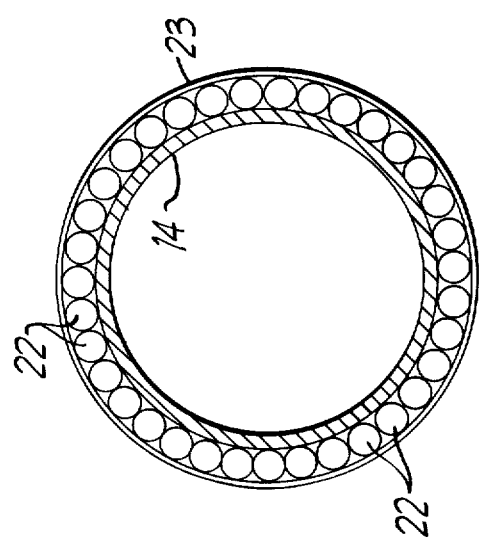
FIG. 2 is a sectional view taken along the line 2—2 of FIG. 3 showing the arrangement of cooling tubes employed in the device of FIG. 1.

Cooling tubes 22 are located around the chamber 14 to cool the hydrogen 13 in the chamber 14 to provide parahydrogen at an appropriate temperature for rotational Raman scattering of $CO_2$ laser radiation. The cooling tubes 22 and a clamp 23 for holding them in place are seen more graphically in FIGS. 2 and 3. In FIG. 3, a source of liquid nitrogen 24 is shown connected to the cooling tubes 22 which are provided for cooling the hydrogen to liquid nitrogen temperature.

Figure 4:
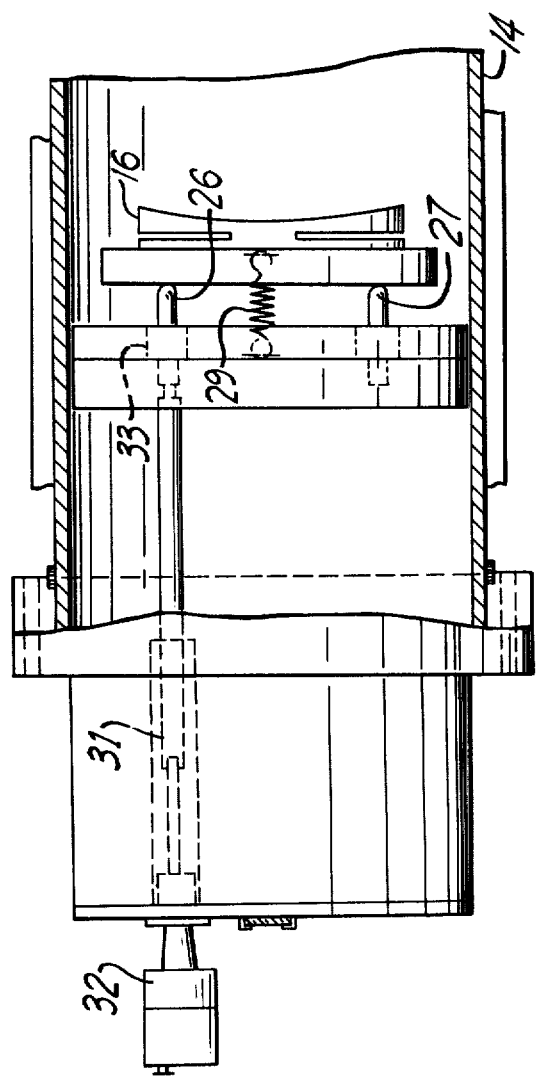
FIG. 4 shows mechanical details of a mirror mounting arrangement employed in the device shown in FIG. 1.

In FIG. 4, we see a mechanical arrangement for adjustably mounting spherical mirror 16 in the hydrogen gas. The mirror 16 is held against pegs 26, 27 and a third peg (not shown) by a spring 29 under tension. A linkage assembly 31 operated by handle 32 adjusts the longitudinal position of the pin 26 to enable precise adjustment of the spherical mirror 16. The pin 26 is adjusted by rotation of the handle 32 moving a thread portion 33 of the pin 26.

In the preferred embodiment of this invention, the power provided by the $CO_2$ laser is 30 megawatts in the $TEM_\infty$ mode. The pulse length of the 30 megawatt pulse is 100 nano-seconds. In order to employ this pulse in the chamber 10 the pulse is circularly polarized by a device, not shown, and mode matched to the off-axis mirrors 16 and 17 by a coated lens 20. The maximum intensity of radiation which can pass through the coated lens 20 is 40 megawatts per square centimeter. The mirrors 16 and 17 are constructed of copper and can withstand a power density of approximately 200 megawatts per square centimeter. The maximum intensity achievable in the focal region between the mirrors 16 and 17 is approximately $10^9$ watts per square centimeter before plasma breakdown occurs in the parahydrogen. Thus, to achieve maximum intensity between the mirrors 16 and 17 without plasma breakdown and to stay within the power intensities referred to above, the preferred embodiment of this invention has a separation between mirrors 16 and 17 of 13 feet.

As seen in FIG. 1, the radiation from the $CO_2$ laser 12 is directed through the hole 19 in the mirror 16 to strike the mirror 17 at the point numbered 2. It should be appreciated that this point is equidistant from the axis as is the hole 19. In the example shown, the radiation passes between the mirrors 16 and 17 fifteen times before exiting. The number of passes between the mirrors 16 and 17 is determined by the radius of curvature of the mirrors 16 and 17 and the spacing therebetween. Since the distance between the mirrors is 13 feet, it should be appreciated that the radiation traverses the parahydrogen between the mirrors 16 and 17 for 195 nano-seconds which is about twice the pulse width of the $CO_2$ laser 12. Thus it can be appreciated that by the apparatus as described above, amplification by rotational Raman scattering of $CO_2$ radiation periodically refocussed is achieved in the parahydrogen for a greater period of time than could otherwise be achieved. Thus the amplification achieved is greater than could have been achieved otherwise, and further the possibility of generating a substantial backward travelling wave is minimized.

Although this invention has been described with respect to its preferred embodiments, it should be understood that many variations and modifications will now be obvious to those skilled in the art, and it is preferred, therefore, that the scope of the invention be limited, not by the specific disclosure herein, only by the appended claims.

What is claimed is:

1. Apparatus for producing radiation by Raman scattering including:
   a first spherical mirror having a first concave reflecting surface which is a section of a sphere having a first predetermined radius and a first center of curvature;
   a second spherical mirror having a second concave reflecting surface which is a section of a sphere having a second predetermined radius and a second center of curvature;
   means for mounting said first and second spherical mirrors with said first and second concave reflecting surfaces facing each other, defining an optical axis including said first and second centers of curvature, said optical axis intersecting said first and second concave reflecting surfaces;
   a Raman active medium which responds to a first frequency of radiation to produce a second frequency of radiation by Raman scattering;
   means for maintaining said Raman active medium between said first and second spherical mirrors;
   focusing means for introducing radiation of said first frequency between said first and second spherical mirrors along a path which intersects said first and second spherical mirrors but is not parallel to said optical axis thereby producing radiation of said second frequency by stimulated Raman scattering; said focusing means also focusing said introduced radiation mode matching said introduced radiation to said first and second spherical mirrors;
   said first center of curvature being located between said second center of curvature and said second concave reflecting surface; and said second center of curvature being located between said first center of curvature and said first concave reflecting surface.

2. The apparatus as defined in claim 1 in which said first predetermined radius is equal to said second predetermined radius.

3. The apparatus as defined in claim 1 also including means for extracting said radiation of said second frequency.

4. The apparatus as defined in claim 1 in which said Raman active medium is hydrogen and said means for introducing radiation includes a $CO_2$ laser.

* * * * *